Jan. 20, 1970  A. L. ISAACS  3,491,263
LIGHTING SYSTEMS WITH CONTROLLED DIMMING
Filed Oct. 23, 1967  2 Sheets-Sheet 1

ANTHONY LEONARD ISAACS
INVENTOR

BY Lawrence Bevans,
ATTORNEY

United States Patent Office 3,491,263
Patented Jan. 20, 1970

3,491,263
LIGHTING SYSTEMS WITH CONTROLLED DIMMING
Anthony Leonard Isaacs, London, England, assignor to Thorn Electronics Limited, London, England
Filed Oct. 23, 1967, Ser. No. 677,172
Claims priority, application Great Britain, Oct. 21, 1966, 47,344/66
Int. Cl. H05b 37/02
U.S. Cl. 315—293                                       6 Claims

ABSTRACT OF THE DISCLOSURE

A stage or studio lighting system compares the brightness of a lamp before a change with the desired brightness after a change and controls fading to take place at a speed proportional to the difference between initial and final brightness, thereby ensuring that all changes take place in the same time and at a uniform rate so that lighting balance is maintained. Fading is terminated when the actual brightness reaches the desired brightness. The operation is effected by means of digital stores containing brightness counts representative of initial, actual, and final brightnesses, and analogue comparators fed from the stores through digital-to-analogue converters. A multiplicity of lamps can be controlled by the use of time-divided channels for individual lamp groups.

---

The present invention relates to lighting systems particularly but not exclusively stage and studio lighting systems.

To fade, that is make more or less bright, stage or studio lighting one of two automatic systems has usually been used. The first system uses motor driven dimmers which operate at a constant speed. Consequently large changes in brightness take longer than small changes and where some lamps or groups of lamps have to make greater changes than others "balance" between the various lamps is lost during the change. The other system uses proportional servo-system control of the dimmers with the result that changes occur exponentially, fast at first, and very slow towards the end of the change, with the result that "balance" is again lost during the change.

According to the present invention there is provided apparatus for automatically changing the brightness of lamps, comprising first storage means for storing information representing the brightness of a lamp before a change in brightness, second storage means for storing information representing the desired brightness of the lamp, comparator means for comparing first and second signals derived from the information stored by the first and second storage means, respectively, to provide a difference signal proportional to the difference between the first and second signals, means for changing the brightness of the lamp at a rate proportional to the magnitude of the difference signal, and means for causing the brightness change to cease when the lamp reaches the desired brightness.

The rate of change of lamp brightness now depends on the difference between the initial brightness and the desired brightness. Consequently the change is made in the same time regardless of how large the change is, and the rate of change is uniform throughout the change. Several lamps or groups of lamps controlled in this way complete changes in equal times and lighting balance is maintained.

The first and second signals are preferably digital signals known as brightness counts, and stored in core stores. These brightness counts may be passed to digital to analogue converters whose analogue outputs are compared in the comparator means. The analogue output of the comparator means may then be passed to an analogue-to-digital converter whose output is used to change the brightness count stored in a further core store. Information is read out of the further core store to set a dimmer controlling the lamp.

In one arrangement there are three core stores known as the studio core store, the fader core store and the preset core store, each having associated buffer stores and digital-to-analogue converters. The studio digital-to-analogue converter controls the dimmer and has an output to a "raise" and a "dim" comparator which are part of the means for causing the change in brightness to cease. The outputs of the fader and preset digital to analogue converters are compared by the comparator means which has two outputs. The first of these outputs in a "raise" output on which a signal appears if the signal from the preset digital-to-analogue converter is greater than that from the fader digital-to-analogue converter. The other output is a "dim" output on which a signal appears if the signal from the fader digital-to-analogue converter is greater than that from the preset digital-to-analogue converter. The first output is coupled to a first gate which is enabled only when there is an output from the "raise" comparator and manual "fade-up" or "cross fade" controls are operated. Similarly the second output is coupled to a second gate which is enabled only when there is an output from the "dim" comparator and manual "fade-down" or "cross fade" controls are operated. The outputs from the two gates are passed to the analogue-to-digital converter, which provides pulses at a rate dependent on the difference of the signals applied to the comparator means. These pulses alter the count in the studio buffer store and hence the brightness of the lamp. When the count in the studio buffer store reaches that in the fader or preset stores that gate which is open closes, since it no longer receives one of its inputs, and the process ceases.

Apparatus according to the invention may be used to control a plurality of groups of lamps, each group being allotted a channel in a time divided system. In this case lighting plots representing the brightness of lamps in the groups are filed in a file core store, and transferred to fader, studio and preset core stores as required. A scanning system then transfers brightness counts for each channel from these stores to the corresponding buffer stores at the time allotted to that channel. In the same way banks of dimmers, each dimmer controlling a group of lamps are scanned and connected to the studio digital to analogue converter at the appropriate time.

Only part of the operation of fading the lamps of one channel may be carried out each time the buffer stores contain counts pertaining to that channel. A number of cycles of all the channels will then take place before fading is complete.

The analogue to digital converter is preferably the voltage controlled oscillator (V.C.O.) described in more detail in our copending application of the same date entitled Analogue to Digital Converter (British application No. 47,329/66). The V.C.O. has an analogue voltage applied thereto and receives pulses from a pulse generator. The repetition frequency of pulses from V.C.O. output depends on the voltage applied.

Two such V.C.O. units may be used; one coupled to the "raise" gate and one to the "dim" gate. It is then possible to control the rate of fading by adding a further two V.C.O. units between the pulse generator and the V.C.O. units coupled to the gates. Voltages applied to the further V.C.O units then control the rate of fade by varying the repetition frequency of the pulses applied to the other VC.O. units.

An embodiment of the invention will now be described, by way of example, with reference to the accompanying drawings, in which.

Figure 1:
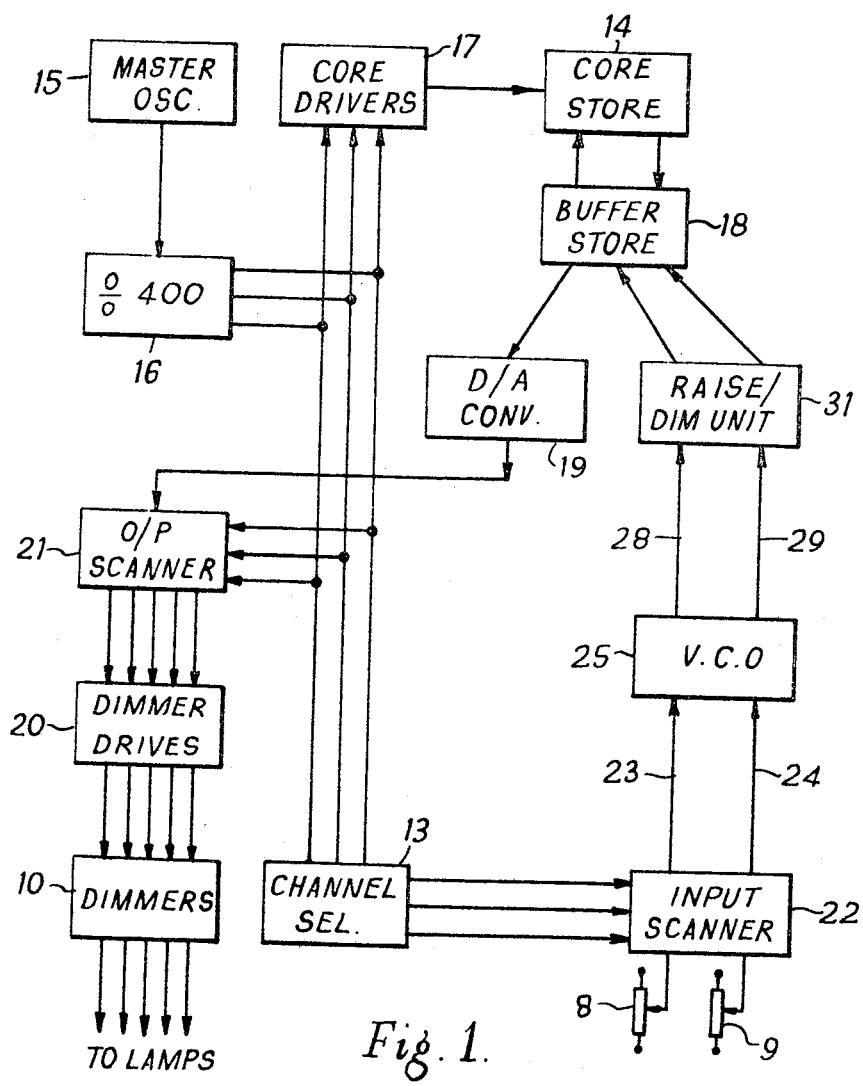
FIG. 1 is a block diagram of a basic stage lighting control system.

In the stage lighting system of FIG. 1 a bank 10 of dimmers controls groups of lamps (not shown). The intensity of light from any group of lamps can be changed by moving the control lever, or dolly, of one of ten faders numbered 0 to 9, two of which 8 and 9 are shown in FIG. 1. If a dolly is moved in one direction the brightness of a group of lamps selected by a channel selector 13 is continuously increased, at a rate depending on the position of the dolly, until the lamps are at maximum intensity. Movement of the dolly in the other direction dims the lamps continuously.

Each group of lamps is allocated a channel and eight cores in a core store 14. One of the cores registers a one-bit "ON/OFF" signal, and the other seven register a seven bit brightness count giving the required brightness for the group of lamps. The channels are time divided and for this purpose a 40 kc./s. master oscillator 15 supplies pulses to a divider circuit 16, having two cascaded divide-by-ten stages and two cascaded divide-by-two stages. The first divide-by-ten stage gives a units output, the second divide-by-ten stage gives a tens output, and the two divide-by-two stages give a four state hundreds output. The channels are numbered from 0 to 399 and have a duration of twenty-five microseconds. The outputs from the divider circuit are passed to core drivers 17, which at the beginning of each twenty-five micro-second channel period, using the conventional half current pulses applied to X and Y axis wires of the matrix of the store 14, select the eight cores allocated to one of the channels and transfer their contents to a buffer store 18. The contents of the buffer store is then converted to an analogue voltage by a digital to analogue converter 19. The resultant voltage is passed to a selected dimmer drive unit 20, by an output scanner 21 comprising a sampling matrix of AND gates controlled by the outputs of the divider circuit 16 and feeding four hundred reservoir capacitors. The sampling matrix, timed from the main divider waveforms, decommutates the 400-channel time sequential signal from the digital-to-analogue converter 19 into four hundred parallel signals on the four hundred reservoir capacitors. These signals, one per lighting channel, are shaped in the dimmer drive units 20 into signals controlling the four hundred dimmers, one per lighting channel.

At the end of each twenty-five micro-second period the contents of the buffer store are read back into the core store, and the contents of the next eight cores corresponding to the next channel are read into the buffer store.

The ten faders are used to enter the required brightness counts into the core store 14 and to change them. Each fader is selected to control one channel in the way described in our copending application of the same date entitled "Lighting Control Apparatus" (British application No. 47,340/66) and supplies a voltage to a V.C.O. 25 during the time allocated to a selected channel. The V.C.O. 25 receives pulses from the divider 16 and provides cyclic series of pulses in each channel on output wires 28 and 29 whose count in a V.C.O. cycle is proportional to the voltage supplied by the fader selected for that channel.

When the brightness count of a group of lamps, represented by the states of eight cores allocated to that group has been read into the buffer store 18, a raise/dim unit 31 raises or lowers the count at one unit per pulse received along wires 28 or 29 during the appropriate channel period. The number of these pulses received in one cycle of the V.C.O. depends on the position of the dolly of the fader selected for that group of lamps and the brightness count is altered accordingly.

Figure 2:
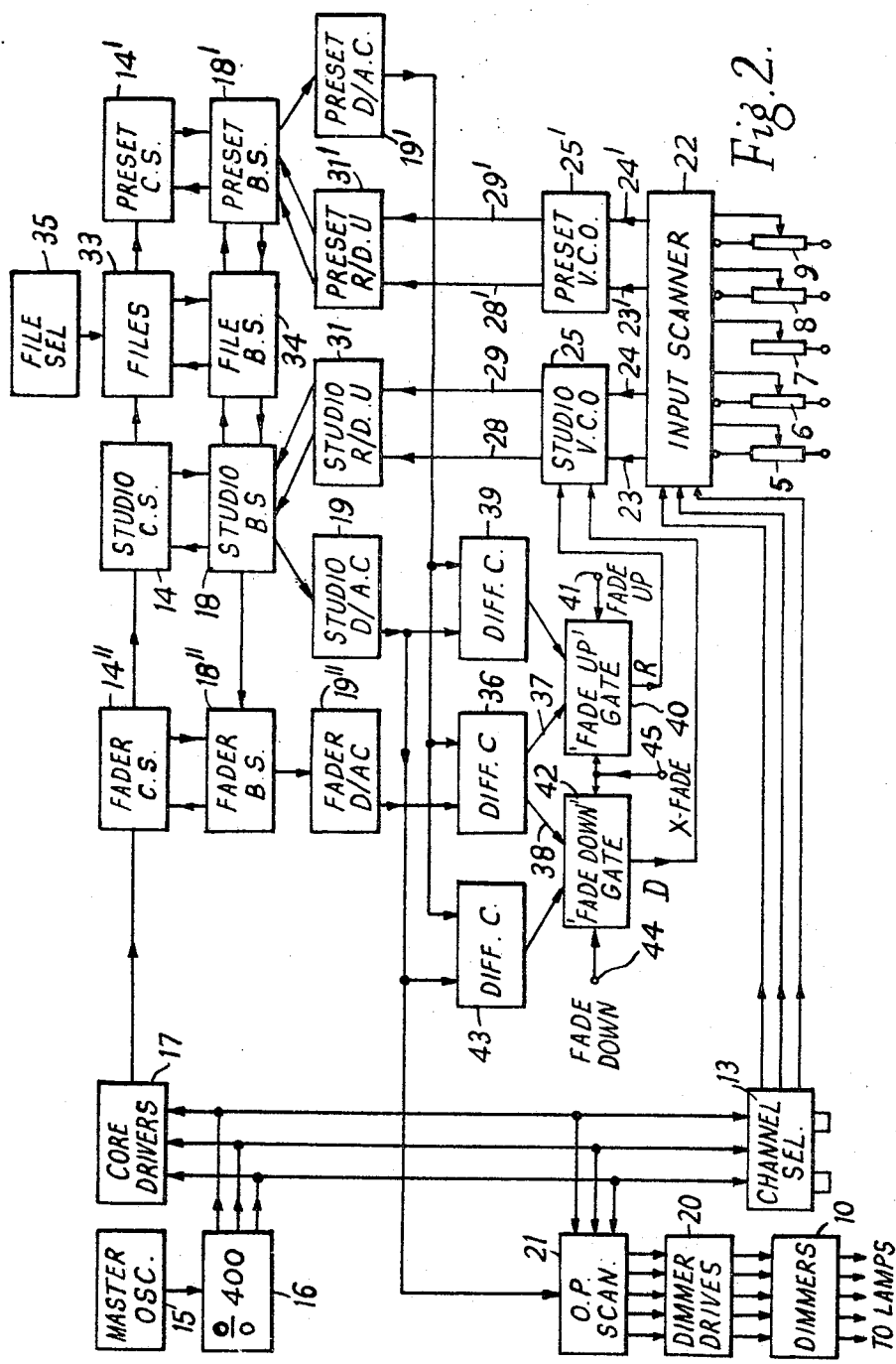
FIG. 2 is a block diagram of a modified stage lighting system which also includes fading apparatus according to the invention.

In FIG. 2 the basic system of FIG. 1 is modified and facilities for fading lamps according to predetermined lighting plots are provided. The V.C.O. raise/dim unit, buffer store, core store and digital to analogue converter of FIG. 1 are designated in FIG. 2 as studio V.C.O. studio raise/dim unit, studio buffer store, studio core store and studio digital to analogue converter. Other units which have the same functions are given the same designations in FIGS. 1 and 2. A second and third series of units are provided and comprise a preset core store 14', a preset buffer store 18', a preset V.C.O. 25'., a preset digital to analogue converter 19', and a preset Raise/Dim unit 31', and a fader core store 14", a fader buffer store 18", and a fader digital to analogue converter 19". The input scanner 22 has alternative pairs of output leads so that the channel selector 13 and faders may be all switched together to control the contents of either the preset core store 14' or studio core store 14. The contents of either store may be "filled," in a group of file core stores 33, by push-button operation. In filing, the contents of studio or preset core store are read-out channel by channel into the appropriate buffer store and thence are registered in a file buffer store 34. As the studio or preset buffer store contents are written back into the appropriate core store, the file buffer store contents are written into a file core store selected from, for example, a group of one hundred such file stores by a file selector 35 operated by push-buttons. Information may be transferred by push-button between the studio and file buffer stores and between the preset and file buffer stores in either direction.

In rehearsal an arrangement of channel brightness counts that is, a "lighting plot," is set up on selected lighting channels; this lighting plot is filed in a first file. A second lighting plot is set up and filed in a second file, and so on. In a production each lighting plot in the files may be read-out non-destructively into the studio core store 14 to control the lighting channels. Channels for lighting plots may be preselected using either the studio or the preset core store. Channels registered in a selected File may be indicated on an illuminated mimic diagram (not shown), the lamps being operated from the stored 1-bit "ON/OFF" signal. Filed plots may be added to an existing plot set-up or registered in the studio or preset core stores.

When a first lighting plot is to be gradually changed, that is faded to a second plot the first lighting plot is set-up in rehearsal and filed, and the levels of some lighting channels in this plot are now raised to give a second plot which is also filed. In a production the first plot is read into the studio core store 14 and is also transferred into the fader core store 14". The second plot is read into the preset core store 14'. A differential comparator 36 produces on one of two output leads an analogue output proportional in any channel period to the difference between the outputs of the preset and fader brightness counts that is the brightness counts registered in the preset and fader buffer stores. This analogue output appears on a "raise" lead 37 if the preset brightness count is greater than the fader brightness count and on a "dim" lead 38 if it is less. A differential comparator 31 produces an enabling signal in the period of any channel for which the preset brightness count exceeds the studio brightness count, which is passed together with the output of the differential comparator 36 to a "fade-up" gate 40 with a push-button control 41. Analogue "raise" signals in the channel periods of channels having greater preset brightness counts than fader brightness counts, and substantially proportional in a given channel to the difference between these counts are passed by the "fade-up" gate 40 to the studio V.C.O. 25 to produce "raise" pulses at proportionate rates. On operation of the "fade-up" control 41 the brightness counts in the studio core store 14 change from their starting values (1st plot, fader core store) to their finishing values (2nd plot, preset core store) at a rate substantially proportional in any channel to the difference in preset and fader brightness counts for that channel. When the studio brightness count for a channel becomes equal to its preset brightness count the enabling signal from comparator 31 disappears and "raise" pulses in that channel period cease. Since the "raise" rates are substantially proportional to differences between initial and final brightness counts all channels transfer from initial to final brightness in substantially the same time regardless of the magnitude of brightness change in any channel. This maintains balance during fades.

A "fade-down" is performed in a similar way by taking the "dim" output 38 of the differential comparator 36 to a "fade-down" gate 42, opened when a signal from a differential comparator 43 comparing studio and preset brightness counts, and a signal from a "fade-down" push button control 44 are both present. The differential comparator 36 gives an output signal proportional to the difference between the studio and preset brightness counts, so controlling the fade rate. When the studio brightness count is equal to the preset brightness count the enabling signal from differential comparator 43 ceases, inhibiting "fade-down" gate 42; fade-down then ceases.

A cross-fade between two plots necessitating both raising and dimming is made similarly by a "Cross Fade" push-button control 45 energizing both "fade-up" and "fade-down" gates 40 and 42 simultaneously. "Raise" and "dim" analogue control voltages appear at the outputs of the "fade-up" and "fade-down" gates as appropriate to the sense and magnitude of the change to be made in each channel.

Independent control of "fade-up" and "fade-down" times can be obtained by using two V.C.O. units in place of the V.C.O. 25. One, a "raise" V.C.O. has "raise" output only coupled to the studio "raise-dim" unit 31, and the other, a "dim" V.C.O., has a "dim" output only also coupled to the unit 31. A first additional V.C.O. is then connected to control the pulses supplied to the "raise" V.C.O. unit, that is in the connection (not shown) to the divider 16. A voltage applied to this first additional V.C.O. will control the pulse rate of pulses reaching the "raise" V.C.O. Similarly a second additional V.C.O. is connected between the divider 16 and the "dim" V.C.O.

Two channels may be allocated to control "raise" and "dim" times for lighting plots. If the analogue outputs from the output scanner 21 for these channels are used as the control voltages for the additional "raise" and "dim" V.C.O. units, determining the "fade-up" and "fade-down" times, the counts stored by the cores allotted to these channels become digital encodements of the selected fade times, and may be filed with one of the relevant lighting plots. The one-bit "ON/OFF" signals may be used to switch-in optional "fast/slow" fixed dividers.

I claim:

1. Apparatus for automatically changing the brightness of lamps, comprising first storage means for storing information representing the brightness of a lamp before a change in brightness, second storage means for storing information representing the desired brightness of the lamp, comparator means for comparing first and second signals derived from the information stored by the first and second storage means, respectively, to provide a difference signal proportional to the difference between the first and second signals, means for changing the brightness of the lamp at a rate proportional to the magnitude of the difference signal, and means for causing the brightness change to cease when the lamp reaches the desired brightness.

2. Apparatus as claimed in claim 1, in which the first and second storage means are core stores and the first and second signals are digital signals.

3. Apparatus as claimed in claim 2, including first and second digital to analogue converters coupled between the first and second storage means respectively as the comparator means.

4. Apparatus as claimed in claim 3, in which the means for changing the brightness of the lamp comprise a dimmer for controlling the brightness of the lamp, a studio core store from which a brightness count is read out to set the dimmer, and an analogue to digital converter connected between the comparator means and the studio core store to change the brightness count at a rate determined by the analogue output of the comparator means.

5. Apparatus as claimed in claim 4, in which the means for causing the change in brightness to cease comprise a "raised" comparator and a "dim" comparator each of which is controlled by the second storage means and by the studio core store whereby an output is generated by the "raise" comparator as long as the brightness count of the studio core store is below the desired brightness and an output is generated by the "dim" comparator as long as the brightness count of the studio core store is above the desired brightness, the output of the "raise" comparator being applied to a "fade-up" gate connected to the comparator means to receive the difference signal when the second signal represents a greater brightness than the first signal and the output of the "dim" comparator being applied to a "fade-down" gate connected to the comparator means to receive the difference signal when the second signal represents a smaller brightness than the first signal.

6. Apparatus as claimed in claim 5, for control of a plurality of groups of lamps including a file core store for receiving lighting plots representing the brightness of the lamps, the file core store being interconnected with the first and second storage means and the studio core store for the transfer of lighting plots as required by way of respective buffer stores, and a scanning system for transferring brightness counts to the buffer stores at allotted times in a time-divided system and connecting the appropriate dimmer for control by the transferred brightness count.

References Cited

UNITED STATES PATENTS

| 3,004,193 | 10/1961 | Bentham et al. | 315—316 X |
| 3,157,821 | 11/1964 | Passmore et al. | 315—316 X |
| 3,221,214 | 11/1965 | Wolff et al. | 315—292 |

JOHN W. HUCKERT, Primary Examiner

R. F. POLISSACK, Assistant Examiner

U.S. Cl. X.R.

315—294, 299, 307, 316, 317, 318, 319; 340—146.2